(12) United States Patent
Himmelmann (10) Patent No.: US 10,265,707 B2
(45) Date of Patent: Apr. 23, 2019

(54) MOTOR COOLING CIRCUIT WITH INTEGRATED FOD PARTICLE SEPARATOR

(71) Applicant: Hamilton Sundstrand Corporation, Windsor Locks, CT (US)

(72) Inventor: Richard A. Himmelmann, Beloit, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 159 days.

(21) Appl. No.: 15/386,245

(22) Filed: Dec. 21, 2016

(65) Prior Publication Data
US 2018/0169669 A1 Jun. 21, 2018

(51) Int. Cl.
*B64D 13/00* (2006.01)
*B64D 13/06* (2006.01)
(Continued)

(52) U.S. Cl.
CPC .............. *B04C 3/06* (2013.01); *B01D 45/16* (2013.01); *B01D 53/00* (2013.01); *B64D 13/00* (2013.01);
(Continued)

(58) Field of Classification Search
CPC ............ B64D 13/00; B64D 13/06; B64D 2013/0651; F04D 29/703; F04D 29/5806; F04D 19/00; F04D 25/06; F04D 29/701
(Continued)

(56) References Cited

U.S. PATENT DOCUMENTS 2,641,902 A * 6/1953 Kerr ................... F02K 7/16 55/306
3,309,867 A * 3/1967 Franklin ................ F02C 7/05 415/121.2
(Continued)

FOREIGN PATENT DOCUMENTS

DE 102004035688 A1 3/2005
EP 0558091 A1 9/1993
(Continued)

OTHER PUBLICATIONS

Extended European Search Report for EP Application No. 17209067.2, dated May 18, 2018, 13 Pages.
(Continued)

*Primary Examiner* — Amber R Orlando
*Assistant Examiner* — Minh Chau T Pham
(74) *Attorney, Agent, or Firm* — Kinney & Lange, P.A.

(57) ABSTRACT

A ram circuit for an aircraft includes a ram inlet housing, a ram outlet housing, a heat exchanger, a ram air fan, and a particle separator. The ram inlet housing includes a chamber and an inlet configured to receive air. The ram outlet housing is fluidly connected to the ram inlet housing. The heat exchanger is disposed between and fluidly connected to the inlet housing and the outlet housing. The ram air fan is disposed in the outlet housing and includes a motor with a cooling inlet. The particle separator includes an outer inlet and a clean air outlet. The outer inlet is configured to receive ram air from the chamber of the ram inlet housing and faces into a flow of air passing through the chamber. Clean air is discharged through the clean air outlet which is fluidly connected to the cooling inlet of the motor.

16 Claims, 5 Drawing Sheets

(51) Int. Cl.
  *F04D 19/00* (2006.01)
  *F04D 25/06* (2006.01)
  *B04C 3/06* (2006.01)
  *B01D 45/16* (2006.01)
  *B01D 53/00* (2006.01)
  *B04C 3/00* (2006.01)

(52) U.S. Cl.
  CPC ........ *B64D 13/06* (2013.01); *B04C 2003/006* (2013.01); *B64D 2013/0618* (2013.01); *B64D 2013/0651* (2013.01)

(58) Field of Classification Search
  USPC ........ 55/306, 385.1; 60/39.092; 62/172, 498
  See application file for complete search history.

(56) References Cited

U.S. PATENT DOCUMENTS

| | | | | |
|---|---|---|---|---|
| 3,362,155 A | * | 1/1968 | Driscoll | F02C 7/05 415/121.2 |
| 3,611,679 A | | 10/1971 | Pall | |
| 3,616,616 A | | 11/1971 | Flatt | |
| 3,825,212 A | | 7/1974 | Darges et al. | |
| 3,998,048 A | * | 12/1976 | Derue | B64D 33/02 55/306 |
| 4,255,174 A | * | 3/1981 | Simpson | B01D 45/16 55/306 |
| 4,261,168 A | * | 4/1981 | Grigorian | B64D 33/02 415/121.2 |
| 4,502,875 A | | 3/1985 | Ballard | |
| 4,527,387 A | | 7/1985 | Lastrina et al. | |
| 4,591,312 A | * | 5/1986 | Wenglarz | F01D 25/007 415/121.2 |
| 4,685,942 A | | 8/1987 | Klassen et al. | |
| 4,966,005 A | * | 10/1990 | Cowell | B64D 13/06 62/172 |
| 7,258,713 B2 | | 8/2007 | Eubank et al. | |
| 7,879,123 B2 | * | 2/2011 | Lundquist | B04C 3/00 55/306 |
| 8,015,787 B2 | * | 9/2011 | Snyder | B01D 45/02 244/53 B |
| 2003/0024233 A1 | * | 2/2003 | Snyder | B01D 45/08 60/39.092 |
| 2014/0202121 A1 | | 7/2014 | Beers et al. | |
| 2015/0308460 A1 | * | 10/2015 | Lucic | B64D 13/06 415/1 |
| 2016/0146511 A1 | * | 5/2016 | Hipsky | F25B 13/00 62/498 |
| 2016/0200446 A1 | * | 7/2016 | Sharma | B01D 53/227 62/646 |
| 2016/0281978 A1 | | 9/2016 | Fernandes et al. | |

FOREIGN PATENT DOCUMENTS

| | | |
|---|---|---|
| EP | 2746588 A2 | 6/2014 |
| FR | 1069071 A | 7/1954 |
| FR | 2904046 A1 | 1/2008 |
| GB | 676231 A | 7/1952 |
| WO | WO2016032585 A2 | 3/2016 |

OTHER PUBLICATIONS

Partial European Search Report for EP Application 17209067.2, dated Feb. 16, 2018, 13 Pages.

* cited by examiner

MOTOR COOLING CIRCUIT WITH INTEGRATED FOD PARTICLE SEPARATOR

BACKGROUND

The present disclosure relates to a ram air fan assembly. In particular, the disclosure relates to an inlet tube for a ram air fan assembly of an aircraft.

The environmental control system ("ECS"), including the ram air fan assembly, aboard an aircraft provides conditioned air to a cabin of the aircraft. Conditioned air is air at a desired temperature, pressure, and humidity for aircraft passenger comfort. Compressing ambient air at flight altitude heats the resulting pressurized air sufficiently that it must be cooled, even if the ambient air temperature is very low. Thus, under most conditions, heat must be removed from the air by the ECS before the air is delivered to the aircraft cabin. As heat is removed from the air, it is dissipated by the ECS into a separate stream of air that flows into the ram air fan assembly, across heat exchangers in the ram air fan assembly, and out of the aircraft, carrying the excess heat with it. Under conditions where the aircraft is moving fast enough, the pressure of air ramming into the aircraft is sufficient to move enough air through the ram air fan assembly and over the heat exchangers to remove the excess heat.

While ram air works well under normal flight conditions, at lower flight speeds, or when the aircraft is on the ground, ram air pressure is too low to provide enough air flow across the heat exchangers for sufficient heat removal from the ram air fan assembly.

Typically, ram air fan assemblies utilize an electric motor to drive the fan. This is accomplished by a rotor assembly, which is driven by a stator. The stator generates a significant amount of heat as a byproduct of the magnetic field used to drive the rotor assembly. Additionally, bearings that support the rotor assembly typically produce heat and, therefore, require cooling. As a result of these sources of heat, the electric motor must be cooled by sources such as external air. Thus, air is provided to the stator and bearings of the ram air fan along one or more flow paths from upstream or downstream of the ram air fan in the ECS.

Due to the collection inlet(s) location in the ECS (and the aircraft) adjacent the ram air fan assembly, the collection inlet(s) for cooling air are exposed to a high volume of particulate (such as dirt) during operation, which can result in foreign object damage ("FOD"). Thus, it is desirable to reduce the amount of particulate that reaches those components. Existing particle separators can be ineffective at removing particulate from cooling air as previous particle separators require a high velocity clean airstream, which may not be available at the ram air fan and the area there around. As a result, existing particle separators are subject to problems such as clogging or operate in an undesirable manner by introducing particle laden cooling air to interior components of the ram air fan. Additionally, existing particle separators do a good job of removing the FOD, however, they have a relatively large pressure drop due to the rapid change in air velocity, which tends to reduce the mass flow rate of cooling air passing through the motor.

SUMMARY

A ram circuit for an aircraft includes a ram inlet housing, a ram outlet housing, a heat exchanger, a ram air fan, and a particle separator. The ram inlet housing includes a chamber and an inlet configured to receive air. The ram outlet housing is fluidly connected to the ram inlet housing. The heat exchanger is disposed between and fluidly connected to the inlet housing and the outlet housing. The ram air fan is disposed in the outlet housing and includes a motor with a cooling inlet. The particle separator includes an outer inlet and a clean air outlet. The outer inlet is configured to receive ram air from the chamber of the ram inlet housing and faces into a flow of air passing through the chamber. Clean air is discharged through the clean air outlet which is fluidly connected to the cooling inlet of the motor.

A particle separator for a ram circuit in an aircraft includes an inlet, a clean air outlet, a dirty air outlet, an outer shroud, an inner tube, a center body, a first set of vanes, a second set of vanes, and a third set of vanes. The inlet is configured to receive ram air at an upstream end of the particle separator. The clean air is discharged through the clean air outlet from a downstream end of the particle separator. The dirty air outlet surrounds the clean air outlet. The outer shroud includes an upstream end, a downstream end, and an outer inlet disposed at the upstream end of the outer shroud. The outer inlet of the outer shroud is disposed in a ram inlet housing of the ram circuit in the aircraft. The outer inlet of the outer shroud faces in a upstream direction of a flow of air through the ram inlet housing at a location of the outer inlet of the outer shroud. The inner tube with an inner inlet is disposed at an upstream end of the inner tube. A portion of the inner tube is disposed radially within the outer shroud. The inner inlet of the inner tube is positioned downstream of the outer inlet of the outer shroud relative to a flow of the air through the particle separator. The center body is disposed partially within the inner tube and partially within the outer shroud. The first set of vanes extends radially between and is affixed to the center body and the shroud. The first set of vanes is also positioned downstream from the outer inlet and upstream of the inner inlet. The first set of vanes is configured to impart swirl onto a first flow of air passing across the first set of vanes. The second set of vanes extends radially between and is affixed to the center body and the inner tube. The second set of vanes is positioned downstream of the first set of vanes. The second set of vanes is also configured to stabilize swirl of a second flow of air passing across the second set of vanes. The third set of vanes extends radially between and affixed to the inner tube and the outer shroud. The third set of vanes is positioned downstream of the first set of vanes. The third set of vanes is configured to stabilize swirl of a third flow of air passing across the third set of vanes.

A ram circuit includes a ram inlet housing, a particle separator, a ram outlet housing, a heat exchanger, a ram air fan, and a conduit. The ram inlet housing includes an inlet. The particle separator is disposed within the ram inlet housing and is configured to receive ram air at an upstream end of the particle separator. The particle separator includes an outer inlet at the upstream end of the particle separator and includes a face with a center-point located at a point within the ram inlet housing where a velocity of a flow of the air through the ram inlet housing is at a maximum. The particle separator includes a center body, constriction region, first set of vanes, second set of vanes, third set of vanes, dirty air outlet, and clean air outlet. The center body is disposed partially within the inner tube and partially within the outer shroud. The constriction region is axially aligned with the body and is positioned between the center body and the outer shroud. The constriction region is configured to accelerate an airflow passing between the center body and the outer shroud. The first set of vanes extends radially between and is affixed to the center body and the shroud. The first set of vanes is configured to impart swirl onto a first flow of air passing across the first set of vanes. The first set of vanes is also configured to centrifuge particles in the first flow of air within the particle separator. The second set of vanes extends radially between and is affixed to the center body and the inner tube. The second set of vanes is configured to stabilize swirl of a second flow of air passing across the second set of vanes. The third set of vanes extends radially between and is affixed to the inner tube and the outer shroud. The third set of vanes is configured to stabilize swirl of a third flow of air passing across the third set of vanes. The dirty air outlet surrounds the clean air outlet. Clean air is discharged through the clean air outlet. The ram outlet housing is fluidly connected to the ram inlet housing. The heat exchanger is disposed between and is fluidly connected to the inlet housing and the outlet housing. The ram air fan is disposed in the outlet housing and includes a motor with a cooling inlet. The conduit fluidly connects the clean air outlet of the ram inlet housing to the cooling inlet of the motor of the ram air fan.

DETAILED DESCRIPTION

Motors within ram air fan assemblies can experience winding failures due to an inadequate motor cooling flow rate and foreign object debris ("FOD") ingestion, which can plug the motor cooling channels causing the motor to overheat and fail. Current examples of motor cooling paths utilize a downstream facing tube to provide clean cooling air to the motor. An example of such a design can be found in US Patent Application US2015/0308460A1 to Lucic et al. which is incorporated herein in its entirety. That design effectively removes FOD, however, the downstream facing tube can cause a fairly high pressure drop to occur in the cooling line due to the tube inlet facing in the downstream direction, thereby reducing the motor cooling flow rate and causing the motor to operate at a higher temperature. A new motor cooling flow inlet is needed that eliminates FOD while also increasing motor cooling flow rate.

Figure 1:
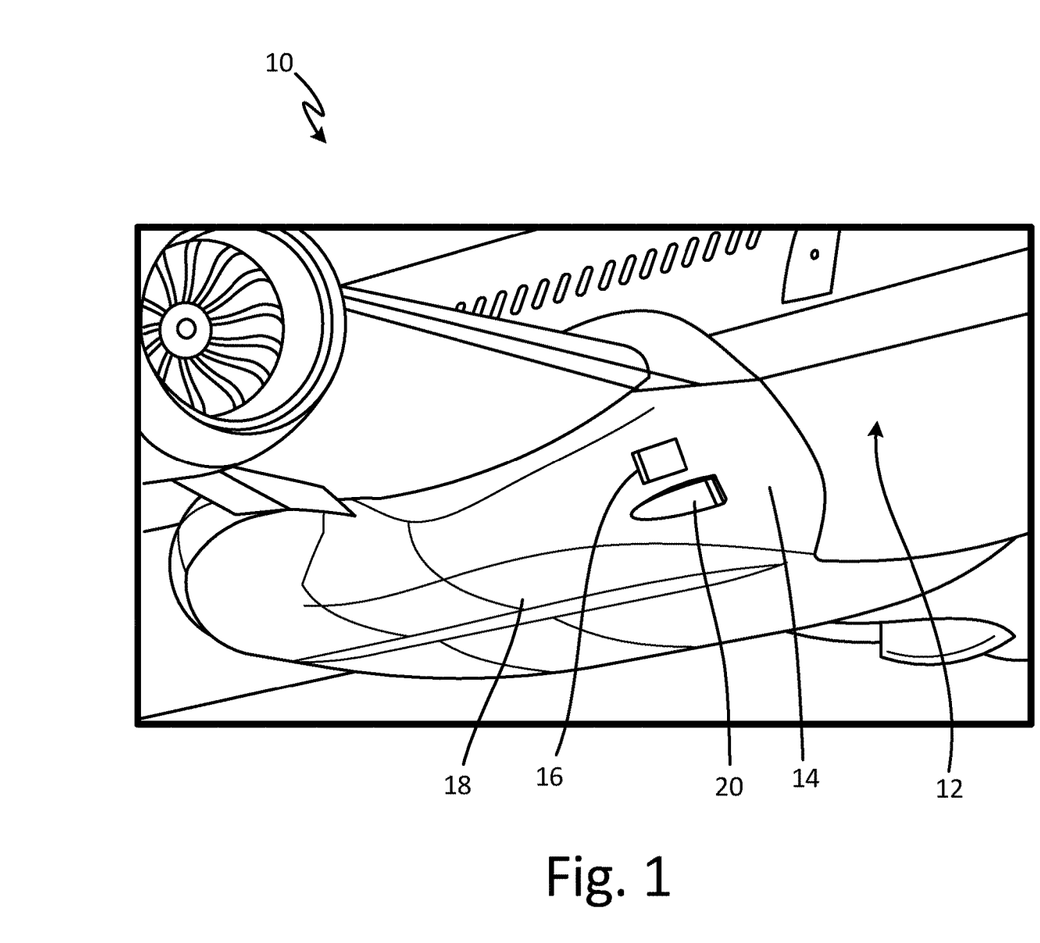
FIG. 1 is a perspective view of a portion of an aircraft.

FIG. 1 shows a partial perspective view of aircraft 10. Aircraft 10 includes fuselage 12, bottom surface 14, ram circuit inlet 16, ram circuit outlet 18, and cabin air compressor inlet 20.

Aircraft 10 is an airplane. In other non-limiting embodiments, aircraft 10 could also be other types of fixed-wing or rotorcraft such as propeller aircraft, jet aircraft, or helicopters. Fuselage 12 is a main body section of aircraft 10. Bottom surface 14 is a surface along the bottom of aircraft 10. Ram circuit inlet 16 is an inlet for a ram circuit of aircraft 10. Ram circuit outlet 18 is an outlet for the ram air circuit of aircraft 10. Cabin air compressor inlet 20 is an inlet for a cabin air compressor system of aircraft 10.

Bottom surface 14 is connected and attached to fuselage 12 of aircraft 10. Ram air inlet 16 is fluidly connected to ram circuit outlet 18 via the ram circuit. Ram air inlet 16 and ram circuit outlet 18 are physically connected to and located along bottom surface 14 of aircraft 10. Cabin air compressor inlet 20 includes a door that opens when the aircraft is on the ground.

A ram air fan of the ram circuit draws outside air into the ram circuit through ram circuit inlet 16, across a set of heat exchangers, and then dumps the heated air outside of airplane 10 through ram circuit outlet 18. The ram air flow is utilized to cool a cabin air conditioning and temperature control system pack bleed circuit, a pod environmental control system circuit, and a forward cargo air conditioning circuit. Cooling of the cabin air conditioning and temperature control system pack bleed circuit, the pod environmental control system circuit, and the forward cargo air conditioning circuit prevents the circuits from overheating and/or malfunctioning during operation of aircraft 10.

Figure 2:
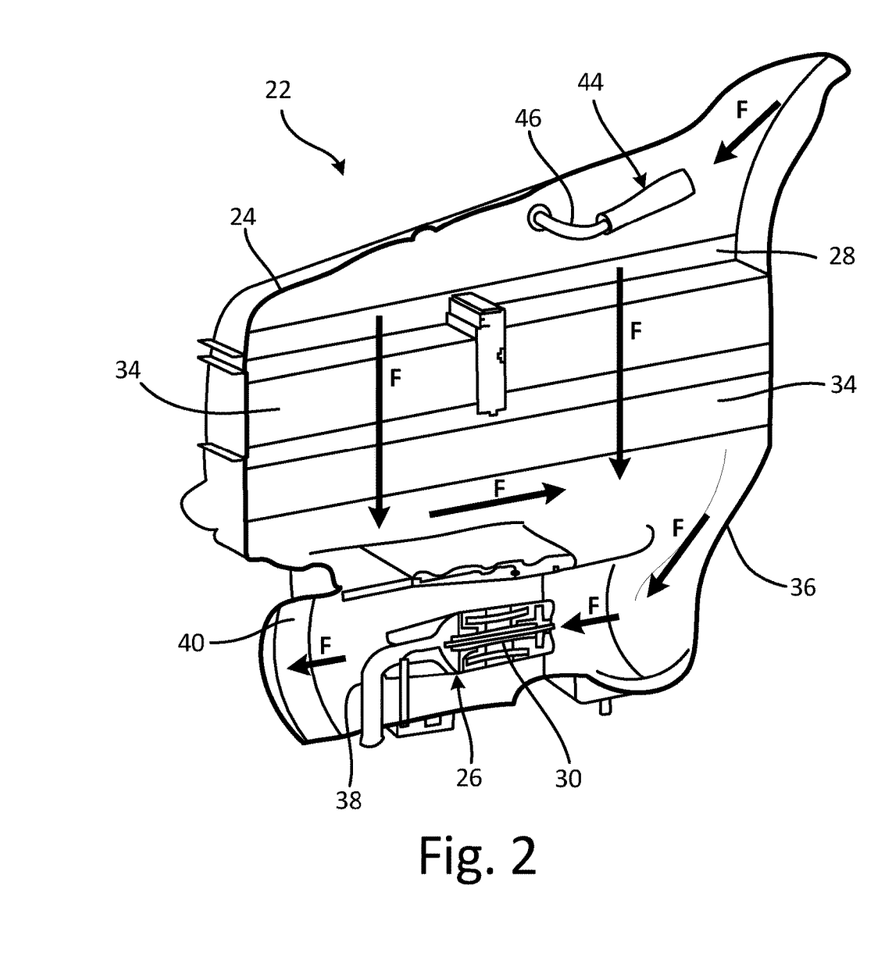
FIG. 2 is a cross-section view of a ram circuit of the aircraft.
Figure 3:
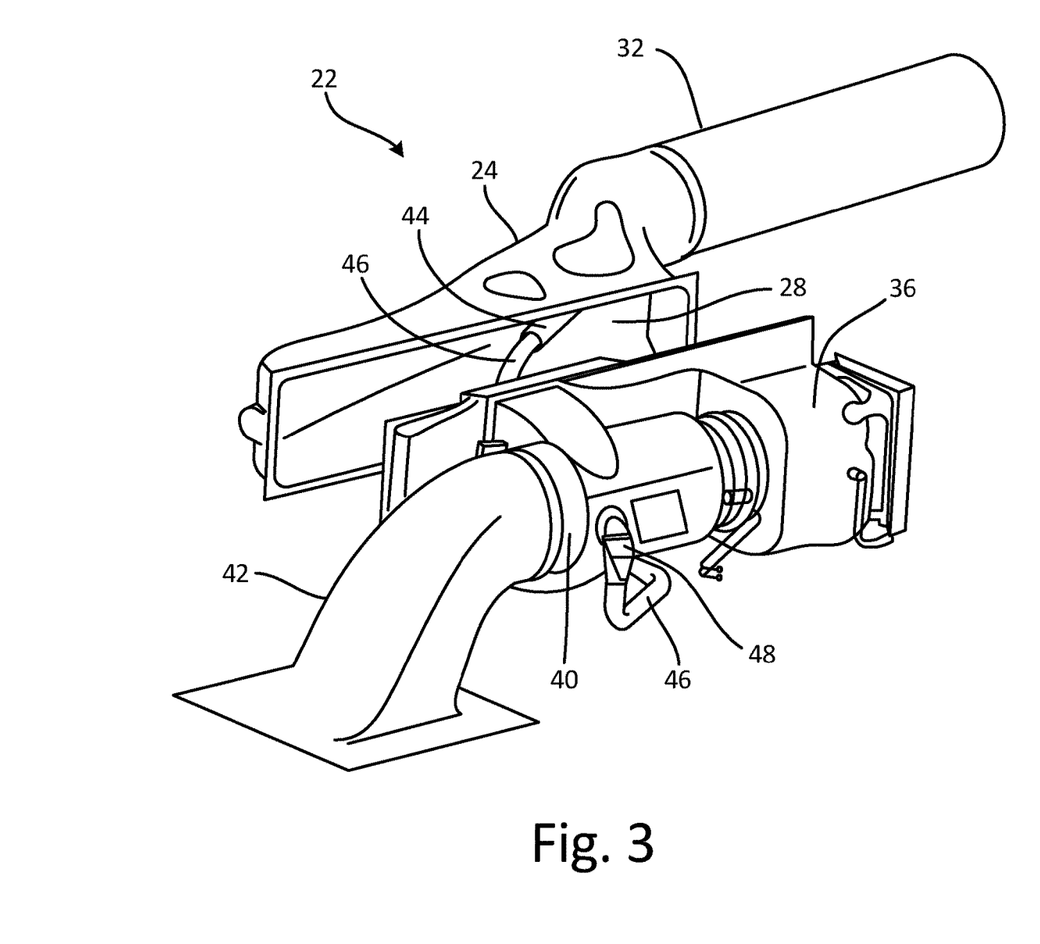
FIG. 3 is a perspective view of a ram inlet header and a ram air fan.
Figure 4:
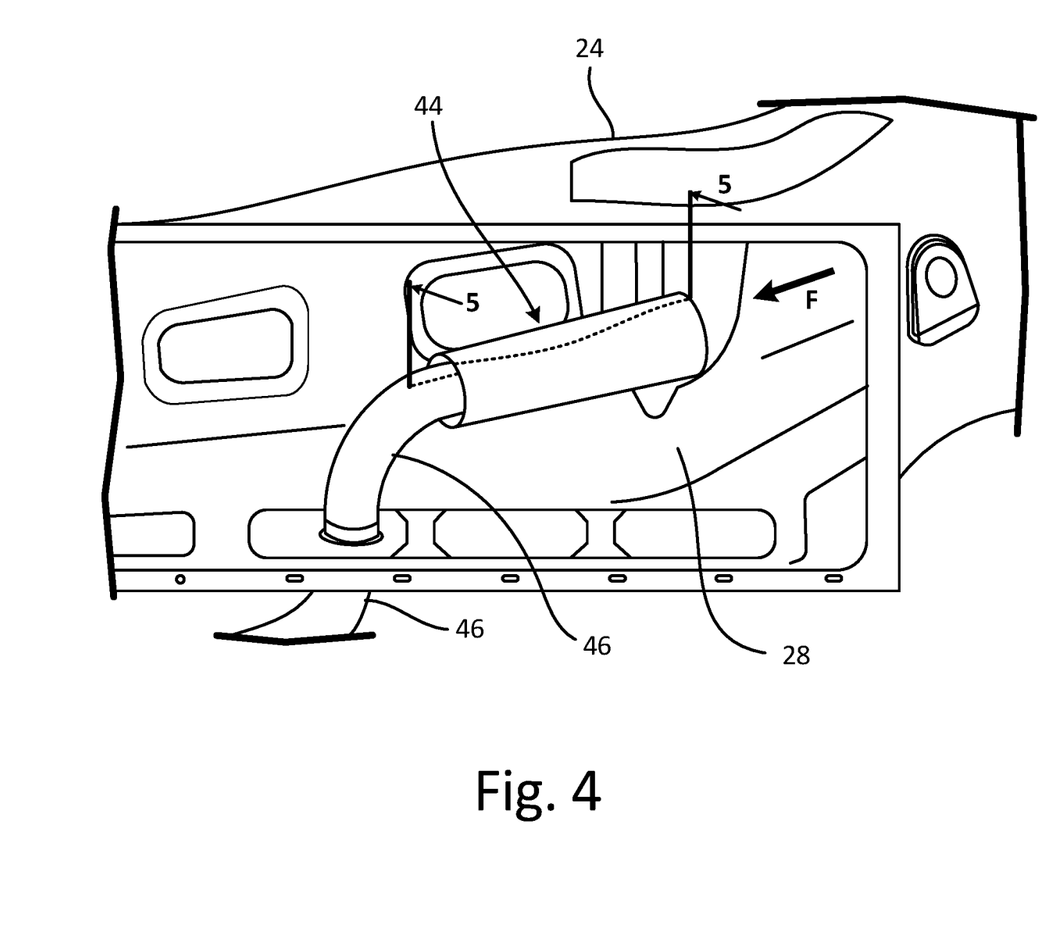
FIG. 4 is a perspective view of the ram inlet header and a particle separator.

FIG. 2 shows a cross-section view of ram circuit 22 of aircraft 10. FIG. 3 shows a perspective view of ram inlet housing 24 and ram air fan 26. FIG. 4 shows a portion of ram inlet housing 24. FIGS. 2, 3, and 4 will be discussed together. Ram circuit 22 includes ram inlet housing 24 (with chamber 28), ram air fan 26 (with motor 30), inlet tube 32, heat exchangers 34, ram outlet housing 36, ram air fan outlet 40, ram outlet duct 42, particle separator 44, conduit 46, and elbow 48.

Ram circuit 22 is a fluidic circuit that captures ambient air travelling relative to aircraft 10 for cooling applications within aircraft 10. Ram inlet housing 24 is an inlet housing for ram circuit 22. Ram air fan 26 is a motorized fan that draws air through ram circuit 22. Chamber 28 is a chamber within ram inlet housing 24. Motor 30 is an electric motor of ram air fan 26. Inlet tube 32 is a tube or cylinder of solid material for transmission of a fluid. Heat exchangers 34 are thermal energy absorbing devices for drawing thermal energy from a fluid passing across heat exchangers 34. Ram outlet housing 36 is a housing with an outlet for passing a fluid. Cooling inlet 38 of ram air fan 26 is an inlet of ram air fan 26 for cooling air to enter into motor 30. Ram air fan outlet 40 is an outlet of ram air fan 26. Ram outlet duct 42 is a metal duct extending from ram air fan 26.

Particle separator 44 is a device for the centrifugal separation of particles from air passing through particle separator 44. In one non-limiting embodiment, particle separator 44 can be formed of a single homogenous piece of material such as by layer-by-layer additive manufacturing. In other non-limiting embodiments, particle separator 44 can be manufactured through welding or other alternative fastening methods. A material of particle separator 44 can include, aluminum, metallic alloys, or plastic with the addition of a metallic vapor deposition coating. Additional coating or surface finishes can be applied to particle separator 44 to provide additional durability and abrasion prevention. Conduit 46 is a piece of tubing configured for the transportation of a fluid. Elbow 48 is an angled piece of tubing. Flow F of the air is a representation of the flowpath of air passing through ram circuit 22.

Ram inlet housing 24 is fluidly connected to ram outlet housing 36 across heat exchangers 34. Ram air fan 26 is mounted within ram outlet housing 36. Ram air fan 26 is fluidly connected to heat exchangers 34 via ram outlet housing 36. Ram air fan 26 is fluidly connected to particle separator 44 via conduit 46 and cooling inlet 38. Chamber 28 is contained within ram inlet housing 24 and is fluidly connected to heat exchangers 34. Motor 30 of ram air fan 26 is disposed within ram air fan 26 and is fluidly connected to chamber 28 of ram inlet housing 24 via elbow 48, conduit 46, and particle separator 44. Inlet tube 32 is physically and fluidly connected to ram inlet housing 24. Heat exchangers 34 are disposed between and are fluidly connected to ram inlet housing 24 and ram outlet housing 36. Heat exchangers 34 are physically or fluidly connected to the cabin air conditioning and temperature control system pack bleed circuit, the pod environmental control system circuit, and/or the forward cargo air conditioning circuit of aircraft 10.

Ram outlet housing 36 is physically and fluidly connected to heat exchangers 34 and houses ram air fan 26. Ram outlet housing 36 contains cooling inlet 38 of ram air fan 26. Cooling inlet 38 is physically connected to ram outlet housing 36 and to ram air fan 26. Cooling inlet 38 extends from ram outlet housing 36 to ram air fan 26. Cooling inlet 38 fluidly connects elbow 48 and conduit 46 to motor 30 of ram air fan 26. Cooling inlet 38 is fluidly connected to particle separator 44 via elbow 48 and conduit 46. Ram air fan outlet 40 is physically and fluidly connected to ram outlet housing 36. Ram air fan outlet 40 is fluidly connected to ram air fan 26 and to ram outlet duct 42. Ram outlet duct 42 is physically and fluidly connected to ram air fan outlet 40 of ram outlet housing 36. Ram outlet duct 42 fluidly connects ram air fan 26 to ram circuit outlet 18 of aircraft 10.

Particle separator 44 is disposed in ram inlet housing 24 and is fluidly connected to conduit 46. Particle separator 44 is pointed into flow F of the air flowing through ram inlet housing 24. Conduit 46 is fluidly connected to particle separator 44 and to cooling inlet 38 of motor 30 via elbow 48. A portion of conduit 46 is disposed outside of ram inlet housing 24 and ram outlet housing 36. Elbow 48 is mechanically, chemically, or otherwise coupled and/or attached to conduit 46. Elbow 48 is physically and fluidly attached to cooling inlet 38.

As flow F of the air enters into ram inlet housing 24, flow F is drawn across heat exchangers 34. Flow F of the air is then transported through ram outlet housing 36 and through ram air fan 26. Flow F then flows through ram air fan outlet 40, through ram outlet duct 42, and into an ambient environment via ram circuit outlet 18 (of FIG. 1). Due to the difference in pressure across heat exchangers 34, flow F of the air is pulled from ram inlet housing 24 across heat exchangers 34 and into ram outlet housing 36.

A portion of flow F enters into particle separator 44, travels through particle separator 44, is cleaned by particle separator 44 removing particulate from converting flow F of the air into clean cooling air. The cooling air then travels through conduit 46, through elbow 48, and into cooling inlet 38 of motor 30. The cooling air is pulled through the entire circuit of motor 30 by the difference in pressure from in front of ram air fan 26 to where the cooling air is entering motor 30 through cooling inlet 38.

The cooling air enters into ram outlet housing 36 through conduit 46 and elbow 48. The cooling air travels through cooling inlet 38 and into the back or rear of motor 30. The cooling air then flows past a stator of motor 30. The cooling air then comes out radially between an inlet shroud and a fan rotor on a hub. As the cooling air passes through the components of motor 30, the components of motor 30 are cooled by transferring thermal energy to the cooling air.

In existing ram circuits without particle separator 44, existing ram air fan systems allowed particulate to reach windings of the ram air fan motor. When particulate to reaches the windings of the ram air fan motor, the particulate plugs motor cooling channels which can cause the motor to overheat and fail. Existing solutions for removing particulate from the flow of air into the ram air fan motor, which include pointing a tube in the ram inlet housing in a downstream direction, have been reasonably effective at reducing the particulate entering the cooling motor. However, a drop in pressure associated with such solutions, while reducing the cooling flow to the motor, can cause the motor to operate at a higher temperature because redirecting the flow of air 180° and into the tube requires energy.

Instead of requiring additional energy for flow F of the air to make a 180° turn from a downstream direction to an upstream direction which would consume some of the pressure differential across heat exchanger 34, particle separator 44 of ram circuit 22 captures dynamic energy associated with flow F of the air blowing directly into the upstream face of particle separator 44. With particle separator 44 facing into the high velocity air stream of flow F of the air, this allows particle separator 44 to capture the dynamic energy in the main air stream (flow F of the air), forcing more cooling air into motor 38 of ram air fan 34. Ram circuit 22 with particle separator 44 reduces the rate of particulate entering into the windings of ram air fan 26 while also increasing the cooling flow rate of ram air fan 26. With particle separator 44 facing into an upstream direction of flow F of the air, a greater pressure differential is created across heat exchangers 44 which increase the cooling rate of heat exchangers 44.

Figure 5:
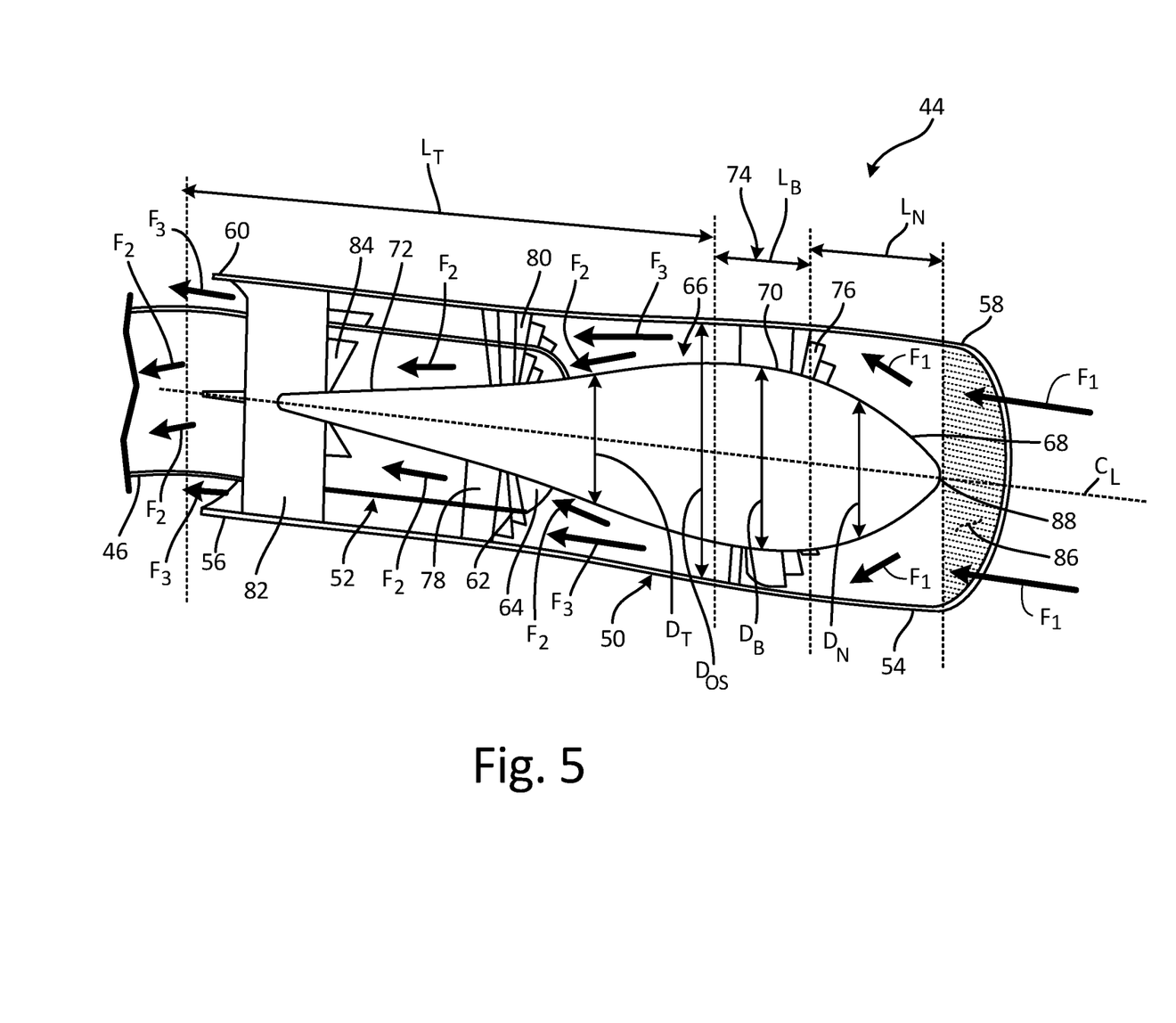
FIG. 5 is a cross-section view of the particle separator taken along 5-5 in FIG. 4.

FIG. 5 shows particle separator 44 which includes outer shroud 50, inner tube 52, upstream end 54 of outer shroud 50, downstream end 56 of outer shroud 50, outer inlet 58, outer outlet 60, upstream end 62 of inner tube 52, inner inlet 64, center body 66, nose 68, body 70, tail 72, constriction region 74, first set of vanes 76, second set of vanes 78, third set of vanes 80, first set of structural fins 82, and second set of structural fins 84. FIG. 5 also shows first airflow $F_1$, second airflow $F_2$, and third airflow $F_3$.

Outer shroud 50 is a sleeve or tube of solid material. Inner tube 52 is a sleeve or tube of solid material. Upstream end 54 of outer shroud 50 is an end of outer shroud 50 located at an upstream end of particle separator 44 (to the right in FIG. 5). Downstream end 56 of outer shroud 50 is an end of outer shroud 50 located at a downstream end of particle separator 44 (to the left in FIG. 5). Outer inlet 58 is an inlet of outer shroud 50 positioned at upstream end 54 of outer shroud 50. Outer inlet 58 includes face 86 with center-point 88. Outer outlet 60 is an outlet of outer shroud 50 positioned at downstream end 56 of outer shroud 50. Outer outlet 60 is a dirty air outlet of particle separator 44. Upstream end 62 of inner tube 52 is an end of inner tube located near an upstream end of particle separator 44 (to the right in FIG. 5). Inner inlet 64 is an inlet of inner tube 52 positioned at upstream end 62 of inner tube 52. Inner inlet 64 is also a clean air outlet of particle separator 44.

Center body 66 is an elongated piece of solid material varying in diameter along a length of center body 66. Center body 66 includes nose 68, body 70, and tail 72. Nose 68 is a cone shaped portion of center body 66 pointing in an upstream direction. Nose 68 includes diameter $D_N$ that increases along length $L_N$ from an upstream end of nose 68 towards a downstream end of nose 68. Body 70 is a portion of center body 66 which includes length $L_B$ and diameter $D_B$ that is generally uniform from an upstream end of body 70 to a downstream end of body 70. Tail 72 is a portion of center body 66 that comes to a point in a downstream direction. Tail 72 includes length $L_T$ and diameter $D_T$ that decreases from an upstream end of tail 72 towards a downstream end of tail 72. Constriction region 74 is a portion of particle separator 44 with a minimum effective flow area as compared to an entire length of particle separator 44.

First set of vanes 76, second set of vanes 78, and third set of vanes 80 are sets of vanes configured to alter a direction of flow of a fluid passing across them. First set of structural fins 82 and second set of structural fins 84 are structural supports extending in a radially outward direction within particle separator 44. First airflow $F_1$ is a flow of air that is entering into particle separator and passes across first set of vanes 76. Second airflow $F_2$ is a flow of air that is diverted radially inward and into inner inlet 64 of inner tube 52. Second airflow $F_2$ includes a stream of clean air devoid of particulate. Third airflow $F_3$ is a flow of air that remains along an inner surface of outer shroud 50. Third airflow $F_3$ includes particulate that was contained in first airflow $F_1$.

Outer shroud 50 is connected to inner tube 52 via first set of structural fins 82. A portion of outer shroud 50 (or dirty air outlet) surrounds a portion of inner tube 52. A portion of inner tube 52 (or clean air outlet) is disposed radially within a portion of outer shroud 50. Inner tube 52 is fluidly connected to outer shroud 50. Outer inlet 58 is disposed at upstream end 54 of outer shroud 50. Outer inlet 58 of outer shroud 50 is disposed in ram inlet housing 24 (of FIGS. 2, 3, and 4) and is facing in a upstream direction of flow F of the air through ram inlet housing 24 at a location of outer inlet 58 of outer shroud 50. Outer outlet 60 (or dirty air outlet) is disposed at downstream end 54 of outer shroud 50. Outer outlet 60 is fluidly connected to chamber 28 of ram inlet housing 24 and to outer inlet 58. Inner inlet 64 is fluidly connected to conduit 46 in a downstream direction from inner inlet 64. Inner inlet 64 of inner tube 52 is positioned downstream of outer inlet 58 of outer shroud 50 relative to flow F of the air through particle separator 44. Inner inlet 64 is fluidly connected to outer inlet 58.

Center body 66 is disposed partially within inner tube 52 and partially within outer shroud 50. Center body 66 is connected to inner tube 52 via second set of structural fins 84. Center body 66 is connected to outer shroud 50 via first set of vanes 76. Nose 68, body 70, and tail 72 are all connected and in one non-limiting embodiment are formed as a single homogenous piece of material. Constriction region 74 is axially aligned with body 70 of center body 66 and is positioned between center body 66 and outer shroud 50. Constriction region 74 is configured to accelerate first airflow $F_1$ passing between center body 66 and outer shroud 50 by accelerating a tangential velocity of first airflow $F_1$ by using the conservation of momentum theory. First set of vanes 76 imparts a spin to first airflow $F_1$ at a large radius of body 70, representing a momentum. Constriction region 74 reduces the radius of the spin, which conserving momentum causes an increase in the tangential velocity of first airflow $F_1$.

First set of vanes 76 extends radially between and is affixed to center body 66 and outer shroud 50. First set of vanes 76 is located upstream of inner tube 52. First set of vanes 76 is configured to impart swirl onto first airflow $F_1$ passing across first set of vanes 76. Second set of vanes 78 extends radially between and is affixed to center body 66 and inner tube 52. Second set of vanes 78 is positioned downstream of first set of vanes 76. Second set of vanes 78 is configured to stabilize swirl of second airflow $F_2$ passing across second set of vanes 78 by diffusing a high velocity of second airflow $F_2$ into a lower velocity flow with a higher static pressure (e.g., dynamic pressure recovery). Third set of vanes 80 extends radially between and is affixed to inner tube 52 and outer shroud 50. Third set of vanes 80 is positioned downstream of first set of vanes 76. Third set of vanes 80 is configured to stabilize swirl of third airflow $F_3$ passing across third set of vanes 80 by diffusing a high velocity of third airflow $F_3$ into a lower velocity flow with a higher static pressure (e.g., dynamic pressure recovery, convert a velocity head into a static head).

First set of structural fins 82 extends radially between and is affixed to inner tube 52 and outer shroud 50. First set of structural fins 82 is disposed downstream of third set of vanes 80. Second set of structural fins 84 extends radially between and is affixed to center body 66 and inner tube 52. Second set of structural fins 84s is disposed downstream of second set of vanes 78 and radially inward from first set of structural fins 82.

Center-point 88 of face 86 is located at a point within ram inlet housing 24 where a velocity of flow F of the air through ram inlet housing 24 is at a maximum. In one non-limiting embodiment, face 86 of outer inlet 58 is orthogonal to flow F of the air at the point within ram inlet housing 24 where the velocity of flow F of the air through ram inlet housing 24 is at a maximum which can be determined by a computational fluid dynamics analysis of flow F of the air passing through ram inlet housing 24.

First airflow $F_1$ enters outer inlet 58 (or the dirty air inlet) and flows past nose 68 and through first set of vanes 76. A shape of center body 66 is configured to force first airflow $F_1$ outwards onto first set of vanes 76 (or spin vanes) to impart swirl or spin in first airflow $F_1$. As first airflow $F_1$ flows past nose 68, first airflow $F_1$ is constricted in the radial direction, causing first airflow $F_1$ to accelerate. First set of vanes 78 induce a swirl or spin into first airflow $F_1$ (or dirty air stream). In one non-limiting embodiment, first airflow $F_1$ enters into outer outlet 60 of outer shroud 50 at a velocity of approximately 40 feet per second. After being constricted by center body 66, first airflow $F_1$ can be accelerated to 150 feet per second. The rotation of first airflow $F_1$ causes particulate in first airflow $F_1$ to be centrifuged to a largest inner radial diameter of outer shroud 50 where particulate gets concentrated.

Downstream of first set of vanes 76, diameter $D_{OS}$ of outer shroud 50 decreases or constricts to briefly enhance the rate of spin of second and third airflows $F_2$ and $F_3$. Center body 66 starts to drop away, e.g., diameter $D_T$ of tail 72 decreases, which diffuses the spin of second and third airflows $F_2$ and $F_3$. Second and third airflows $F_2$ and $F_3$ are then passed through second set of vanes 78 and third set of vanes 80 respectively (e.g., clean air straightening/diffuser vanes and dirty air straightening/diffuser vanes) which de-swirls second and third airflows $F_2$ and $F_3$ respectively. Center body 66 then further reduces in diameter along an aft portion of tail 72 and thereby increasing the flow area of inner tube 52 which diffuses (e.g., slows down) the relatively high velocity of second airflow $F_2$ and slow the rate of second airflow $F_2$ (or clean airflow) in a controlled manner to convert a velocity head back of second airflow $F_2$ of into a static head. Center body 66 can be referred to as a clean air diffuser because center body 66 functions to convert rotational velocity or dynamic head of an airflow passing over center body 66 into minimal rotational velocity or static head.

Second airflow $F_2$ (or clean air) flows near centerline $C_L$ of particle separator 44. Second airflow $F_2$ passes through second set of vanes 78 (or clean air flow straightening vanes), converting the dynamic pressure associated with high rotational velocity into static pressure before entering into cooling inlet 38 of motor 30. Third airflow $F_3$ (or dirty air) containing particulate passes through third set of vanes 80 (or dirty air flow straightening vanes), converting a dynamic pressure associated with the high rotational velocity into a static pressure which allows third airflow $F_3$ to re-enter a main stream of flow F of the air in chamber 28 near outer outlet 60 (or dirty air discharge).

As described above, particle separator 44 incorporates an air centrifuge to effectively remove the FOD from the air stream, without causing a large drop in pressure of the air received by particle separator 44. By facing particle separator 44 directly into flow F of the air through ram inlet housing 24, the use of particle separator 44 does not require energy to turn the airflow entering into particle separator 44 180° from a direction of flow within ram inlet housing 24. This saves energy that would otherwise be consumed in turning the airflow. The configuration of particle separator 44 can increase the motor cooling flow rate by up to 26% or more. This increased cooling flow rate reduces the motor winding temperature by 28° C. on even the worst case hot day condition. Particle separator 44 will inexpensively reduce motor failures while providing retro-fitting capabilities for existing ram circuit designs. Additionally, particle separator 44 will not get plugged or require the use of filters to remove particulate from flow F of the air through particle separator 44.

In the event that a large obstruction restricts outer inlet 58 of particle separator 44 (a large plastic bag or rain coat), air will flow past the obstruction and enter particle separator 44 through outer outlet 60 (the discharge port for the dirty air). This provides the same functionality and performance as existing designs that particle separator 44 was designed to replace.

Discussion of Possible Embodiments

The following are non-exclusive descriptions of possible embodiments of the present invention.

A ram circuit for an aircraft includes a ram inlet housing, a ram outlet housing, a heat exchanger, a ram air fan, and a particle separator. The ram inlet housing includes a chamber and an inlet configured to receive air into the ram inlet housing. The ram outlet housing is fluidly connected to the ram inlet housing. The heat exchanger is disposed between and fluidly connected to the inlet housing and the outlet housing. The ram air fan is disposed in the outlet housing and includes a motor with a cooling inlet. The particle separator includes an outer inlet configured to receive ram air from the chamber of the ram inlet housing. The outer inlet faces into a flow of air passing through the chamber of the ram inlet housing.

The ram air fan assembly of the preceding paragraph can optionally include, additionally and/or alternatively, any one or more of the following features, configurations and/or additional components.

The outer inlet of the particle separator can comprise a face with a center-point, wherein the center-point of the face can be located at a point within the ram inlet housing where a velocity of a flow of the air through the ram inlet housing can be at a maximum.

The face of the outer inlet can be orthogonal to the flow of the air at the point within the ram inlet housing where the velocity of the flow of the air through the ram inlet housing can be at a maximum.

The particle separator can comprise a dirty air outlet surrounding the clean air outlet, the dirty air outlet can be fluidly connected to the chamber of the ram inlet housing.

The particle separator can further comprise an outer shroud, an inner tube with a portion disposed radially within the outer shroud, wherein the inner tube can be fluidly connected to the outer shroud, a center body can be disposed partially within the inner tube and partially within the outer shroud, a set of spin vanes can extend radially between and affixed to the center body and the shroud, wherein the set of spin vanes can be located upstream of the inner tube, further wherein the set of spin vanes can be configured to impart swirl onto a flow of air passing across the set of spin vanes, and/or a set of stabilizing vanes can extend radially between the center body and the outer shroud, wherein the set of stabilizing vanes can be positioned downstream of the set of spin vanes, further wherein the set of stabilizing vanes can be configured to stabilize swirl of a flow of the air passing across the set of stabilizing vanes.

The center body can comprise a nose with a cone shape pointing in an upstream direction, wherein a diameter of the nose can increase from an upstream end of the nose towards a downstream end of the nose, a tail that can come to a point in a downstream direction, wherein a diameter of the tail can decrease from an upstream end of the tail towards a downstream end of the tail, and/or a body can extend between and connected to the nose and the tail, wherein a diameter of the body can be generally uniform.

The particle separator can be formed of a single homogenous piece of material.

A constriction region can be axially aligned with the body and/or positioned between the center body and the outer shroud, wherein the constriction region can be configured to accelerate an airflow passing between the center body and the outer shroud.

A particle separator for a ram circuit in an aircraft includes an inlet, a clean air outlet, a dirty air outlet, an outer shroud, an inner tube, a center body, a first set of vanes, a second set of vanes, and a third set of vanes. The inlet is configured to receive ram air at an upstream end of the particle separator. The clean air is discharged through the clean air outlet from a downstream end of the particle separator. The dirty air outlet surrounds the clean air outlet. The outer shroud includes an upstream end, a downstream end, and an outer inlet disposed at the upstream end of the outer shroud. The outer inlet of the outer shroud is disposed in a ram inlet housing of the ram circuit in the aircraft. The outer inlet of the outer shroud faces in a upstream direction of a flow of air through the ram inlet housing at a location of the outer inlet of the outer shroud. The inner tube has an inner inlet disposed at an upstream end of the inner tube. A portion of the inner tube is disposed radially within the outer shroud. The inner inlet of the inner tube is positioned downstream of the outer inlet of the outer shroud relative to a flow of the air through the particle separator. The center body is disposed partially within the inner tube and partially within the outer shroud. The first set of vanes extends radially between and is affixed to the center body and the shroud. The first set of vanes is also positioned downstream from the outer inlet and upstream of the inner inlet. The first set of vanes is configured to impart swirl onto a first flow of air passing across the first set of vanes. The second set of vanes extends radially between and affixed to the center body and the inner tube. The second set of vanes is positioned downstream of the first set of vanes. The second set of vanes is also configured to stabilize swirl of a second flow of air passing across the second set of vanes. The third set of vanes extends radially between and affixed to the inner tube and the outer shroud. The third set of vanes is positioned downstream of the first set of vanes. The third set of vanes is configured to stabilize swirl of a third flow of air passing across the third set of vanes.

The particle separator of the preceding paragraph can optionally include, additionally and/or alternatively, any one or more of the following features, configurations and/or additional components.

A first set of structural fins can extend radially between and can be affixed to the inner tube and the outer shroud, wherein the first set of structural fins can be disposed downstream of the third set of vanes.

A second set of structural fins can extend radially between and can be affixed to the center body and the inner tube, wherein the second set of structural fins can be disposed downstream of the second set of vanes and radially inward from the first set of structural fins.

The center body can comprise a nose with a cone shape pointing in an upstream direction, wherein a diameter of the nose can increase from an upstream end of the nose towards a downstream end of the nose, a tail that can come to a point in a downstream direction, wherein a diameter of the tail can decrease from an upstream end of the tail towards a downstream end of the tail, and/or a body can extend between and connected to the nose and the tail, wherein a diameter of the body can be generally uniform.

The particle separator can be formed of a single homogenous piece of material.

A constriction region can be between the center body and the outer shroud, wherein the constriction region can be configured to accelerate an airflow passing between the center body and the outer shroud.

The constriction region can be axially aligned with the body.

A ram circuit includes a ram inlet housing, a particle separator, a ram outlet housing, a heat exchanger, a ram air fan, and a conduit. The ram inlet housing includes an inlet. The particle separator is disposed within the ram inlet housing and is configured to receive ram air at an upstream end of the particle separator. The particle separator includes an outer inlet at the upstream end of the particle separator and includes a face with a center-point located at a point within the ram inlet housing where a velocity of a flow of the air through the ram inlet housing is at a maximum. The particle separator includes a center body, a constriction region, a first set of vanes, a second set of vanes, a third set of vanes, a dirty air outlet, and a clean air outlet. The center body is disposed partially within the inner tube and partially within the outer shroud. The constriction region is axially aligned with the body and is positioned between the center body and the outer shroud. The constriction region is configured to accelerate an airflow passing between the center body and the outer shroud. The first set of vanes extends radially between and is affixed to the center body and the shroud. The first set of vanes is configured to impart swirl onto a first flow of air passing across the first set of vanes. The first set of vanes is also configured to centrifuge particles in the first flow of air within the particle separator. The second set of vanes extends radially between and affixed to the center body and the inner tube. The second set of vanes is configured to stabilize swirl of a second flow of air passing across the second set of vanes. The third set of vanes extends radially between and affixed to the inner tube and the outer shroud. The third set of vanes is configured to stabilize swirl of a third flow of air passing across the third set of vanes. The dirty air outlet surrounds the clean air outlet. Clean air is discharged through the clean air outlet. The ram outlet housing is fluidly connected to the ram inlet housing. The heat exchanger is disposed between and is fluidly connected to the ram inlet housing and the ram outlet housing. The ram air fan is disposed in the outlet housing and includes a motor with a cooling inlet. The conduit fluidly connects the clean air outlet of the particle separator to the cooling inlet of the motor of the ram air fan.

The ram circuit of the preceding paragraph can optionally include, additionally and/or alternatively, any one or more of the following features, configurations and/or additional components.

The clean air outlet can be fluidly connected to the cooling inlet of the motor of the ram air fan and the dirty air outlet can be fluidly connected to the ram inlet housing.

The first set of vanes can be positioned downstream from the outer inlet and upstream of the inner inlet; wherein the second set of vanes can be positioned downstream of the first set of vanes, and wherein the third set of vanes can be positioned downstream of the first set of vanes.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A ram circuit for an aircraft, the ram circuit comprising:
   a ram inlet housing with a chamber and an inlet configured to receive air into the ram inlet housing;
   a ram outlet housing fluidly connected to the ram inlet housing;
   a heat exchanger disposed between and fluidly connected to the inlet housing and the outlet housing;
   a ram air fan disposed in the ram outlet housing, wherein the ram air fan comprises a motor with a cooling inlet; and
   a particle separator comprising:
     an outer inlet configured to receive ram air from the chamber of the ram inlet housing and a clean air outlet through which clean air is discharged, wherein the outer inlet faces into a flow of air passing through the chamber of the ram inlet housing, and wherein the clean air outlet is fluidly connected to the cooling inlet of the motor of the ram air fan, wherein the particle separator is configured to centrifugally separate particles from air passing through the particle separator;
     an outer shroud;
     an inner tube with a portion disposed radially within the outer shroud, wherein the inner tube is fluidly connected to the outer shroud;
     a center body disposed partially within the inner tube and partially within the outer shroud;
     a constriction region axially aligned with the body and positioned between the center body and the outer shroud, wherein the constriction region is configured to accelerate an airflow passing between the center body and the outer shroud;
     a set of spin vanes extending radially between and affixed to the center body and the shroud, wherein the set of spin vanes is located upstream of the inner tube, further wherein the set of spin vanes is configured to impart swirl onto a flow of air passing across the set of spin vanes; and
     a set of stabilizing vanes extending radially between the center body and the outer shroud, wherein the set of stabilizing vanes is positioned downstream of the set of spin vanes, further wherein the set of stabilizing vanes is configured to stabilize swirl of a flow of air passing across the set of stabilizing vanes.

2. The ram circuit of claim 1, wherein the outer inlet of the particle separator comprises a face with a center-point, wherein the center-point of the face is located at a point within the ram inlet housing where a velocity of a flow of the air through the ram inlet housing is at a maximum, wherein the maximum of the flow of air through the ram inlet housing is determined by computational fluid dynamics analysis of the flow of air through the ram inlet housing.

3. The ram circuit of claim 2, wherein the face of the outer inlet is orthogonal to the flow of the air at the point within the ram inlet housing where the velocity of the flow of the air through the ram inlet housing is at a maximum.

4. The ram circuit of claim 1, wherein the particle separator comprises:
a dirty air outlet surrounding the clean air outlet, the dirty air outlet is fluidly connected to the chamber of the ram inlet housing.

5. The ram circuit of claim 1, wherein the center body comprises:
a nose with a cone shape pointing in an upstream direction, wherein a diameter of the nose increases from an upstream end of the nose towards a downstream end of the nose;
a tail that comes to a point in a downstream direction, wherein a diameter of the tail decreases from an upstream end of the tail towards a downstream end of the tail, wherein a portion of the tail extends into a portion of the inner tube; and
a body extending between and connected to the nose and the tail, wherein a diameter of the body is generally uniform.

6. The ram circuit of claim 1, wherein the particle separator is formed of a single homogenous piece of material.

7. A particle separator for a ram circuit in an aircraft, the particle separator comprising:
an inlet configured to receive ram air at an upstream end of the particle separator;
a clean air outlet through which clean air is discharged from a downstream end of the particle separator;
a dirty air outlet surrounding the clean air outlet;
an outer shroud with an upstream end, a downstream end, and an outer inlet disposed at the upstream end of the outer shroud, wherein the outer inlet of the outer shroud is disposed in a ram inlet housing of the ram circuit and is facing in a upstream direction of a flow of air through the ram inlet housing at a location of the outer inlet of the outer shroud;
an inner tube with an inner inlet disposed at an upstream end of the inner tube, wherein a portion of the inner tube is disposed radially within the outer shroud and the inner inlet of the inner tube is positioned downstream of the outer inlet of the outer shroud relative to a flow of air through the particle separator;
a center body disposed partially within the inner tube and partially within the outer shroud, wherein a diameter of the center body varies along a length of the center body;
a first set of vanes extending radially between and affixed to the center body and the shroud, wherein the first set of vanes is positioned downstream from the outer inlet and upstream of the inner inlet, further wherein the first set of vanes is configured to impart swirl onto a first flow of air passing across the first set of vanes;
a second set of vanes extending radially between and affixed to the center body and the inner tube, wherein the second set of vanes is positioned downstream of the first set of vanes, further wherein the second set of vanes is configured to stabilize swirl of a second flow of air passing across the second set of vanes; and
a third set of vanes extending radially between and affixed to the inner tube and the outer shroud, wherein the third set of vanes is positioned downstream of the first set of vanes, further wherein the third set of vanes is configured to stabilize swirl of a third flow of air passing across the third set of vanes.

8. The particle separator of claim 7 further comprising a first set of structural fins extending radially between and affixed to the inner tube and the outer shroud, wherein the first set of structural fins is disposed downstream of the third set of vanes.

9. The particle separator of claim 8 further comprising a second set of structural fins extending radially between and affixed to the center body and the inner tube, wherein the second set of structural fins is disposed downstream of the second set of vanes and radially inward from the first set of structural fins.

10. The particle separator of claim 7, wherein the center body comprises:
a nose with a cone shape pointing in an upstream direction, wherein a diameter of the nose increases from an upstream end of the nose towards a downstream end of the nose;
a tail that comes to a point in a downstream direction, wherein a diameter of the tail decreases from an upstream end of the tail towards a downstream end of the tail, wherein a portion of the tail extends into a portion of the inner tube, wherein a diameter of the tail decreases from an upstream end of the tail to a downstream end of the tail; and
a body extending between and connected to the nose and the tail, wherein a diameter of the body is generally uniform.

11. The particle separator of claim 7, wherein the particle separator is formed of a single homogenous piece of material.

12. The particle separator of claim 7 further comprising a constriction region between the center body and the outer shroud, wherein the constriction region is configured to accelerate a flow of air passing between the center body and the outer shroud.

13. The particle separator of claim 12, wherein the constriction region is axially aligned with the body.

14. A ram circuit comprising:
a ram inlet housing with an inlet;
a particle separator disposed within the ram inlet housing and configured to receive ram air at an upstream end of the particle separator, wherein an outer inlet at the upstream end of the particle separator comprises a face with a center-point, wherein the center-point of the face is located at a point within the ram inlet housing where a velocity of a flow of air through the ram inlet housing is at a maximum, wherein the maximum of the flow of air through the ram inlet housing is determined by computational fluid dynamics analysis of the flow of air through the ram inlet housing, the particle separator comprising:
a center body disposed partially within the inner tube and partially within the outer shroud;
a constriction region axially aligned with the body and positioned between the center body and the outer shroud, wherein the constriction region is configured to accelerate an airflow passing between the center body and the outer shroud;

a first set of vanes extending radially between and affixed to the center body and the shroud, wherein the first set of vanes is configured to impart swirl onto a first flow of air passing across the first set of vanes, wherein the first set of vanes is further configured to centrifuge particles in the first flow of air;

a second set of vanes extending radially between and affixed to the center body and the inner tube, wherein the second set of vanes is configured to stabilize swirl of a second flow of air passing across the second set of vanes;

a third set of vanes extending radially between and affixed to the inner tube and the outer shroud, wherein the third set of vanes is configured to stabilize swirl of a third flow of air passing across the third set of vanes;

a clean air outlet through which clean air is discharged; and a dirty air outlet surrounding the clean air outlet;

a ram outlet housing fluidly connected to the ram inlet housing;

a heat exchanger disposed between and fluidly connected to the ram inlet housing and the ram outlet housing;

a ram air fan disposed in the ram outlet housing, wherein the ram air fan comprises a motor with a cooling inlet; and a conduit fluidly connecting the clean air outlet of the particle separator to the cooling inlet of the motor of the ram air fan.

15. The ram circuit of claim 14, wherein the clean air outlet is fluidly connected to the cooling inlet of the motor of the ram air fan and the dirty air outlet is fluidly connected to the ram inlet housing.

16. The ram circuit of claim 14, wherein the first set of vanes is positioned downstream from the outer inlet and upstream of the inner inlet, wherein the second set of vanes is positioned downstream of the first set of vanes, and wherein the third set of vanes is positioned downstream of the first set of vanes.

* * * * *